United States Patent
Gogolla et al.

(10) Patent No.: US 7,940,378 B2
(45) Date of Patent: May 10, 2011

(54) HAND-HELD LASER DISTANCE MEASURING DEVICE WITH A PULSE REFLECTION MIXING METHOD

(75) Inventors: Torsten Gogolla, Schaan (LI); Andreas Winter, Feldkirch (AT); Helmut Seifert, Serba (DE)

(73) Assignee: Hilti Aktiengesellschaft, Schaan (LI)

( * ) Notice: Subject to any disclaimer, the term of this patent is extended or adjusted under 35 U.S.C. 154(b) by 158 days.

(21) Appl. No.: 12/218,554

(22) Filed: Jul. 15, 2008

(65) Prior Publication Data
US 2009/0021721 A1 Jan. 22, 2009

(30) Foreign Application Priority Data
Jul. 16, 2007 (DE) .......................... 10 2007 000 377

(51) Int. Cl.
*G01C 3/08* (2006.01)
(52) U.S. Cl. ...................................... 356/5.15; 356/5.01
(58) Field of Classification Search .................. 356/5.01, 356/5.1, 5.15
See application file for complete search history.

(56) References Cited

U.S. PATENT DOCUMENTS

| | | | | |
|---|---|---|---|---|
| 4,620,788 A * | 11/1986 | Giger | ............................ | 356/5.13 |
| 6,462,705 B1 * | 10/2002 | McEwan | ........................ | 342/175 |
| 6,633,367 B2 * | 10/2003 | Gogolla | ........................ | 356/5.15 |
| 6,917,415 B2 * | 7/2005 | Gogolla et al. | ............... | 356/5.06 |
| 7,023,531 B2 * | 4/2006 | Gogolla et al. | ............... | 356/5.01 |
| 7,535,555 B2 * | 5/2009 | Nishizawa et al. | ........... | 356/5.02 |

* cited by examiner

*Primary Examiner* — Isam Alsomiri
(74) *Attorney, Agent, or Firm* — Abelman, Frayne & Schwab

(57) ABSTRACT

A hand-held laser distance measuring device (1) with pulse reflection mixing includes a control device (2) for calculating the distance (D) to a measurement object (3) over at least one determinable periodic, with a pulse repetition frequency (f), time difference (τ) between a measurement pulse (4) reflected at the measurement object (3) and a reference pulse (6) of an optically emitted transmitting pulse (7) traveling over a reference distance (5) within the device, a local oscillator (8) for generating the transmitting pulse (7) at the pulse repetition frequency (f), at least one delay circuit (9a, 9b) which can be controlled by the control device (2), is arranged between the local oscillator (8) and a light detector (10) and/or a light transmitter (12), and generates a delay between the scanning pulses (11) and the transmitting pulses (7) in order to scan the measurement pulse (4) and the reference pulse (6).

13 Claims, 2 Drawing Sheets

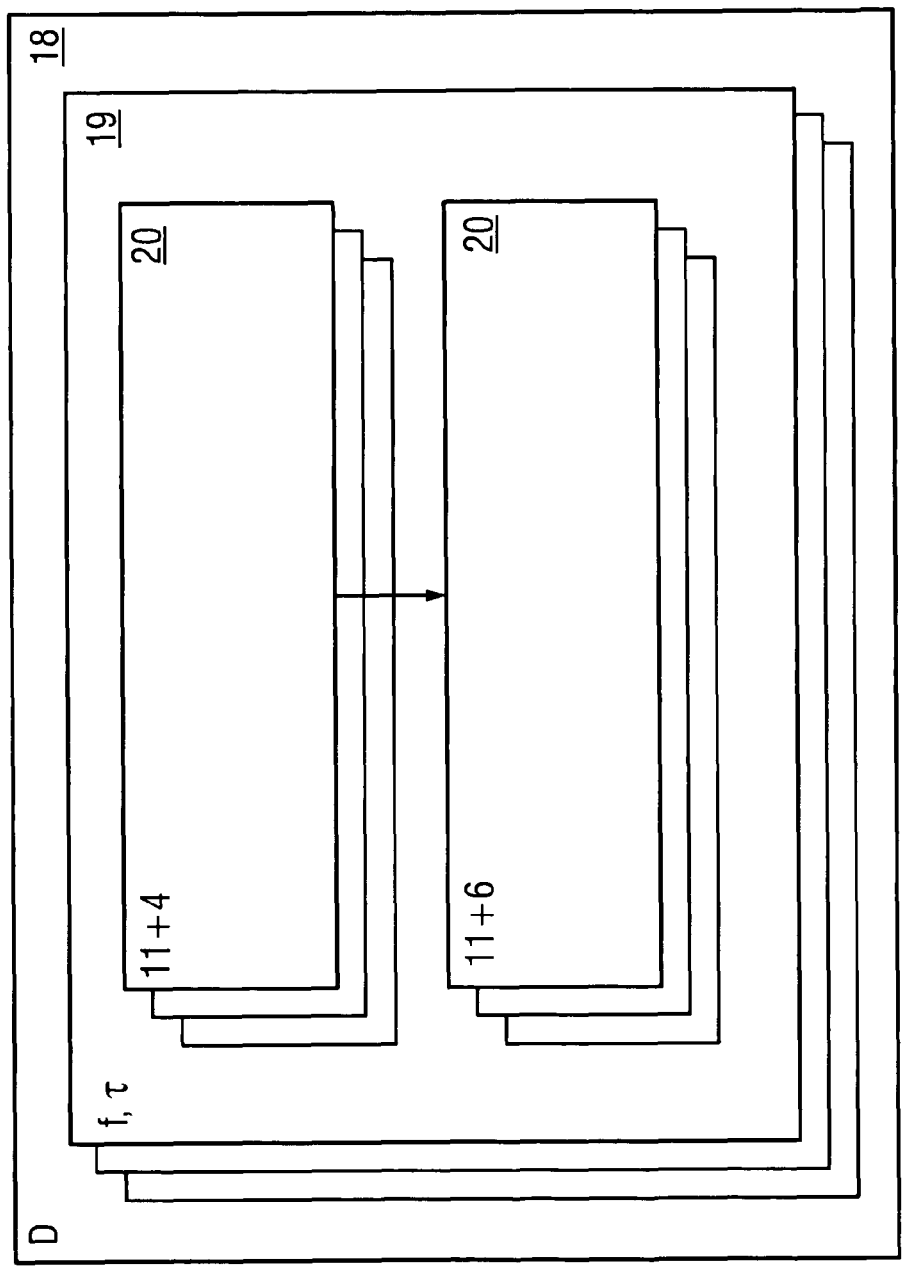

HAND-HELD LASER DISTANCE MEASURING DEVICE WITH A PULSE REFLECTION MIXING METHOD

BACKGROUND OF THE INVENTION

1. Field of the Invention

The invention relates to a hand-held laser distance measuring device using a pulse reflection mixing method, in particular a hand-held construction laser distance measuring device.

2. Description of the Prior Art

In the building industry, distances must be exactly determined with an accuracy of within a few mm at a range of up to several hundreds of meters. The hand-held laser distance measuring devices which are suitably constructed for this purpose and to which the present invention is relates, use a pulse reflection mixing method of a modulated visible laser beam for measuring distances.

U.S. Pat. No. 6,917,415 discloses a hand-held laser distance measuring device in which a pulse reflection mixing method is used. In hand-held laser distance measuring devices of the type mentioned above in which a pulse reflection mixing method is used, commercially available laser diodes emitting in the visible red wavelength range, are used as laser sources. The emitted laser light is modulated by a series of very narrow spike pulses—hereinafter, transmitting pulse train—and bundled by a collimating lens to form a measurement laser beam. Accordingly, this special hand-held laser distance measuring device with pulse reflection mixing requires a series of very narrow laser pulses with a usual width of between 60 ps and 80 ps as transmitting pulse train. The pulse repetition frequency of the laser pulses ranging from 50 MHz to 200 MHz is very high compared to the pulse repetition frequency of several tens of kHz found in conventional hand-held pulse laser distance measuring devices, so that it is generally impossible to determine distances definitively at a range of up to several hundreds of meters distance with one measurement at a determined fixed pulse repetition frequency. Therefore, at least two measurements with two substantially different pulse repetition frequencies or differences of pulse repetition frequencies are needed for a definitive determination of distance, and even more to achieve a high accuracy for very large distance ranges. Using an algorithm, the control device determines the time differences—which are generally not definitive—between the reference pulses and the measurement pulses of the low-frequency mixing pulse train at different pulse repetition frequencies and, from the latter, determines the definitive distance from the rangefinder to the light spot on the measurement object with the help of the light velocity by means of a system of equations. The reference pulse train on the one hand and the measurement pulse train on the other hand, which are detected by the light detector, are directly subjected to direct mixing in the light detector followed by low-pass filtering. The direct mixing is controlled by a local oscillator pulse train which is locally generated at the measurement point and whose duty factor is equal to, or approximately equal to, the duty factor of the measurement pulse train and whose repetition frequencies are selected so as to differ slightly. Accordingly, the mixing pulse repetition frequency of the resulting low-frequency mixing pulse train corresponds to the amount of the difference between the pulse repetition frequency of the transmitting pulse train and measurement pulse train on the one hand and the pulse repetition frequency of the local oscillator pulse train on the other hand. This expands the time base by a greater factor (e.g., 1 million). Like the high-frequency detection pulse train (superposition of the measurement pulse train and the reference pulse train), the low-frequency mixing pulse train likewise comprises frequency-converted reference pulses and measurement pulses whose time delay is a measure of the distance. The low-frequency mixing pulse train with a low mixing pulse repetition frequency of, e.g., less that 1 kH, is low-pass-filtered, amplified, scanned by an analog-to-digital converter, and supplied to the control device which determines the time difference between the frequency-converted reference pulses and measurement pulses and, from the latter, the distance (which is possibly not yet definitive) to the measurement object which, as was described above, is definitively determined by multiple measurements at different pulse repetition frequencies. For further details relating to the generic hand-held laser distance measuring device with a pulse reflection mixing method, the person skilled in the art is referred to the above-cited document, whose disclosure is explicitly incorporated herein by reference thereto.

Since two slightly different pulse repetition frequencies are used in this method, the method is called heterodyne pulse reflection mixing. In heterodyne methods of this kind, all times of a pulse period are run through continuously, although the information content is found only within very short intervals, i.e., at the points of the reference pulses and measurement pulses. Since the reference pulses and measurement pulses make up only a very small percentage of the pulse period, only a small portion of the measuring time is made use of in the frequency mixing.

SUMMARY OF THE INVENTION

It is the object of the present invention to exploit the measuring time more efficiently in the pulse reflection mixing method and, therefore, to increase the sensitivity and range of the hand-held laser distance measuring device.

This object and other objects of the present invention which will become apparent hereinafter, are achieved by providing a hand-held laser distance measuring device with pulse reflection mixing and having a control device for calculating the distance to a measurement object over at least one determinable time difference between a measurement pulse reflected at the measurement object and a reference pulse of an optically emitted transmitting pulse traveling over a reference distance within the device. This time difference being periodic with a pulse repetition frequency. The hand-held laser distance measuring device with pulse reflection mixing further has a local oscillator for generating the transmitting pulse at the pulse repetition frequency and at least one delay circuit which is controllable in a variable manner by the control device and arranged between the local oscillator and a light detector and/or a light transmitter, and generates a delay between the scanning pulses and the transmitting pulses in order to scan the measurement pulse and the reference pulse.

Within the step for calculating the distance from the at least one time difference between the measurement pulse and the reference pulse by the algorithm of the control device, the associated measurement method includes at least one transit time determining step for determining the time difference between the measurement pulses and the reference pulses and, within this transit time determining step, a plurality of scanning steps in which the measurement pulses and reference pulses which are received by the light detector and are periodic in a pulse repetition frequency are scanned directly at the light detector with scanning pulses of precisely this pulse repetition frequency and by which the scanning results are acquired from the control device. A delay between the scanning pulses and the transmitting pulses is controlled by the control device by means of the delay circuit, and the time difference between the measurement pulses and the reference pulses is calculated in the prioritized transit time determining step from precisely those time delays associated with the successful scanning events.

By controlled delay is meant equally the retardation of the scanning pulses with respect to the transmitting pulses or the retardation of the transmitting pulses with resect to the scanning pulses.

Because the measurement pulses and the reference pulses are scanned with the scanning pulses which are variably controlled at the same pulse repetition frequency so as to be delayed in time with respect to the transmitting pulses, this homodyne pulse reflection mixing according to the invention results in a DC signal as a quantitatively large scanning result when the scanning pulses coincide in time with the measurement pulses or reference pulses, instead of a low-frequency mixing pulse train as in a heterodyne pulse reflection mixing of the prior art. In the other case, the DC signal has a low quantity or is zero. Accordingly, the temporal positions of the measurement pulses and reference pulses within the pulse period are known to the control device by means of the time shift which is actively varied by the control device, so that more frequent scanning pulses can be generated by the control device for detecting pulses at these temporal positions which are known beforehand and the measurement time can be made use of more efficiently for detection.

In an advantageous manner, a second delay circuit is provided between the local oscillator and a light detector for transmitting the transmitting pulses. Further, this second delay circuit advantageously has different delay times compared to the first delay circuit which results in more possible combinations with respect to the delay times that are implemented and, therefore, for temporal resolution.

In an advantageous manner, there is one pulse shaper (each) at the output of the delay circuit(s) so that a very short pulse width and, therefore, short scanning are realized so that the measuring accuracy is increased. In this case, the local oscillator itself (which is advantageously controllable) need not be a (good) pulse generator. Further, a programmable frequency splitter is advantageously located in front of the pulse shaper so that (with identical splitting) pulse trains with controllable but identical repetition frequencies can be generated.

A phase detector is advantageously provided and is connected to the control device. The transmitting pulses and the scanning pulses are applied to the two inputs of the phase detector so that the time delay which is varied by the delay circuit(s) can be measured and the delay circuit(s) can be monitored for proper functioning.

The delay circuit is advantageously constructed as a digital delay circuit and, also advantageously, as a fully integrated delay module so that it can be controlled digitally directly by the control device and the exact delay time can accordingly be adjusted.

The light detector is advantageously an avalanche photodiode (APD) whose reverse bias voltage is superimposed with the scanning pulse train supplied by the local oscillator and is used for the homodyne pulse mixing. The gain factor of the avalanche photodiode in the blanking intervals of the scanning pulse train is substantially lower than during the presence of the scanning pulses so that a highly-sensitive scanning of received weak light signals is achieved.

The light detector is advantageously connected to a low-pass filter which is advantageously connected to an amplifier which is advantageously connected to an analog-to-digital converter which is advantageously connected to the control device, so that the DC signal can be acquired by the control device without interference.

The scanning result in the form of an analog DC signal is advantageously first low-pass-filtered in the scanning step and is then amplified and subsequently scanned by an analog-to-digital converter and supplied to the control device in digital form.

The measurement pulses and the reference pulses are advantageously scanned in the transit time determining step in consecutive scanning steps (which are not necessarily strictly alternating or uniformly distributed) so that their time delay with respect to the transmitting pulses can be acquired separately without interference.

The scanned reference pulses and measurement pulses are advantageously time-correlated so that the time shift can be determined.

The measurement pulses or reference pulses are advantageously repeatedly scanned and averaged in the transit time determining step in a plurality of consecutive scanning steps so that their individual scanning results can be accumulated and the time delay with respect to the transmitting pulses can be determined in a robust manner from the superposition of the scan results by correlation.

The time differences of transit time determining steps at different pulse repetition frequencies are advantageously determined for calculating distance so that the definitiveness of the measurement is guaranteed even at great distances. It is further advantageous when the pulse repetition frequency is adjusted or changed in such a way that there is no overlapping between the reference pulses and the measurement pulses.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show:
FIG. 2 an algorithm of the measurement method.

DETAILED DESCRIPTION OF THE PREFERRED EMBODIMENT

Figure 1:
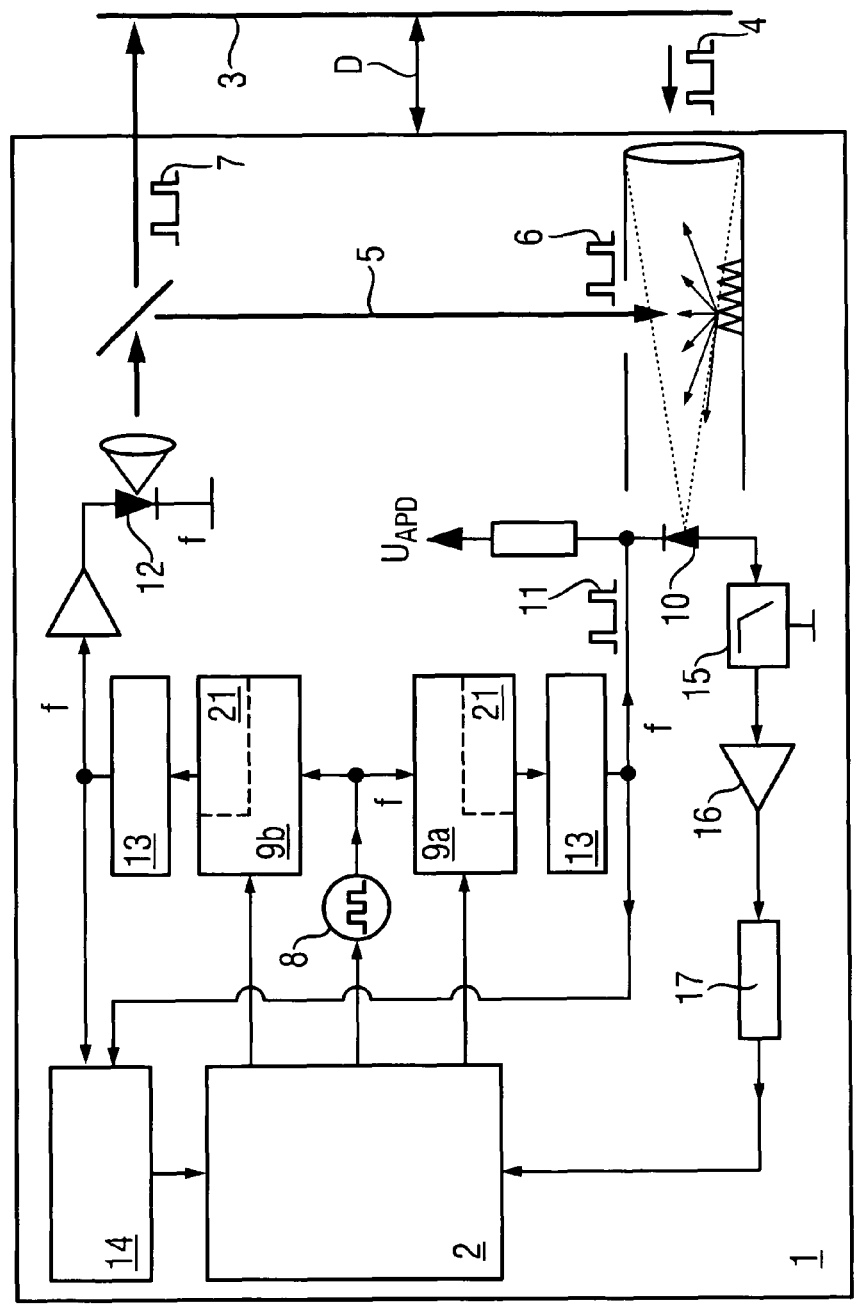
FIG. 1 a schematic view of a hand-held laser distance measuring device with pulse reflection mixing.

As is shown in FIG. 1, the hand-held laser distance measuring device with pulse reflection mixing 1 has a control device 2 in the form of a microcontroller for calculating the distance D to a measurement object 3 over at least one determinable time difference between a measurement pulse 4 reflected at the measurement object 3 and a reference pulse 6 of an optically emitted transmitting pulse traveling over a reference distance 5 within the device, this time difference being periodic with a pulse repetition frequency f. The hand-held laser distance measuring device with pulse reflection mixing also has a controlled local oscillator 8 for generating the transmitting pulse 7 at the pulse repetition frequency f and two delay circuits 9a, 9b which are controllable in a variable manner by the control device 2. The first delay circuit 9a is arranged between the local oscillator 8 and a light detector 10 and generates scanning pulses 11 which are delayed with respect to the transmitting pulses 7 for scanning the measurement pulse 4 and the reference pulse 6. The second delay circuit 9b is arranged between the local oscillator 8 and a light transmitter 12 in the form of a laser diode for transmitting the transmitting pulse 7. The controllable delay circuits 9a, 9b in the form of digital, fully integrated delay building modules each have a programmable frequency splitter 21 in front of the outputs followed by pulse shapers 13. In addition, a phase detector 14 is connected to the control device 2, and the transmitting pulses 7 and scanning pulses 11 are applied to its two inputs. The light detector 10 is constructed as an avalanche photodiode whose reverse bias voltage U_APD is superimposed with the scanning pulse train supplied by the local oscillator 8. The gain factor of the avalanche photodiode in the blanking intervals of the scanning pulse train is substantially lower than during the presence of the scanning pulses 11. Further, the light detector 10 is connected to a low-pass filter 15 which is connected to an amplifier 16 which is connected to an analog-to-digital converter 17 which is connected to the control device 2. Accordingly, the scanning result in the form of an analog DC signal is first low-pass-filtered, then amplified and subsequently scanned by the analog-to-digital converter 17 and is supplied to the control device 2 in digital form.

According to FIG. 2, the measurement method carried out by the algorithm of the control device 2 (FIG. 1) has a calculation step 18 for the definitive calculation of the distance D. For this purpose, a plurality of transit time determining steps 19 are carried out within the calculation step 18 at different pulse repetition frequencies f, each of which determines an associated time difference τ between the measurement pulse 4 and the reference pulse 6, although, taken by themselves, they do not necessarily lead to a definitive distance D. However, the definitive distance D is conclusively calculated in the calculation step 18 as the solution of a linear equation system from all pulse repetition frequencies f and time differences τ. A plurality of scanning steps 20 are carried out in this transit time determining step 19, wherein the measurement pulses 4 which are received by the light detector 10 (FIG. 1) and are periodic in a pulse repetition frequency f (or the reference pulses 5 in consecutive scanning steps) are scanned directly at the light detector 10 (FIG. 1) with scanning pulses 11 of precisely this pulse repetition frequency f and the scanning results are acquired from the control device 2 (FIG. 1). The scanning pulses are controlled by the control device 2 (FIG. 2) by means of the delay circuits 9a, 9b (FIG. 1) so as to have a variable time delay with respect to the transmitting pulses 7, and the time difference τ between the measurement pulses 4 and the reference pulses 6 is calculated in the prioritized transit time determining step 19 from precisely those time delays that are associated with the successful scanning events.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A hand-held laser distance measuring device with pulse reflection mixing, comprising a control device (2) for calculating a distance (D) to a measurement object (3) over at least one determinable time difference (τ) between a measurement pulse (4) reflected at the measurement object (3) and a reference pulse (6) of an optically emitted transmitting pulse (7) traveling over a reference distance (5) within the device, the time difference (τ) being periodic with a pulse repetition frequency (f); a local oscillator (8) for generating the reference pulse (6) and a transmitting pulse (7) at the pulse repetition frequency (f), and for generating a scanning pulse (11) at the pulse repetition frequency (f) for scanning the measurement pulse (4) and the reference pulse (6); and at least one delay circuit (9a, 9b) which can be controlled by the control device (2), is arranged between the local oscillator (8) and at least one of a light detector (10) and a light transmitter (12) for generating a variable delay between the scanning pulse (11) and the transmitting pulse (7) in order to scan the measurement pulse (4) and the reference pulse (6).

2. A hand-held laser distance measuring device according to claim 1, wherein the at least one delay circuit (9a) is arranged between the local oscillator (8) and the light detector (10), the measuring device further comprising a further delay circuit (9b) arranged between the local oscillator (8) and a light transmitter (12) for emitting the transmitting pulse (7).

3. A hand-held laser distance measuring device according to claim 1, comprising a pulse shaper (13) arranged at an output of the delay circuit (9a, 9b).

4. A hand-held laser distance measuring device according to claim 1, wherein the delay circuit (9a, 9b) is digital.

5. A hand-held laser distance measuring device according to claim 1, wherein the light detector (10) has a reverse-biased avalanche photodiode to which the scanning pulses (11) are applied and which is used for homodyne pulse mixing.

6. A hand-held laser distance measuring device according to claim 1, wherein the light detector (10) is connected to a low-pass filter (15) which is connected to an amplifier (16) which is connected to an analog-to-digital converter (17) which is connected to the control device (2).

7. A measurement method for a hand-held laser distance measuring device (1), comprising the following steps:
the calculation step (18) for calculating the distance (D) from at least one time difference (τ) between measurement pulses (4) and the reference pulses (6) by an algorithm of a control device (2);
within the calculation step (18), at least one transit time determining step (19) for determining the time difference (τ) between the measurement pulses (4) and the reference pulses (6);
within this transit time determining step (19), a plurality of scanning steps (20) in which the measurement pulses (4) and reference pulses (6), which are received by the light detector (10) and are periodic in a pulse repetition frequency (f), are scanned directly at the light detector (10) with scanning pulses (11) of precisely this pulse repetition frequency (f) and by which the scanning results are acquired from the control device (2);
the step of variably controlling a delay between the scanning pulses (11) and the transmitting pulses (7) by the control device (2) with the delay circuit (9a, 9b);
and the step of calculating the time difference (τ) between the measurement pulses (4) and the reference pulses (6) in a prioritized transit time determining step (19) from precisely the time delays associated with the successful scanning events.

8. A measurement method according to claim 7, wherein a scanning result in the form of an analog DC signal is first low-pass-filtered, then amplified and subsequently scanned by an analog-to-digital converter (17), and is finally supplied to the control device (2) in digital form.

9. A measurement method according to claim 7, wherein the measurement pulses (4) and the reference pulses (6) are scanned in successive scanning steps (20) in the transit time determining step (19).

10. A measurement method according to claim 9, wherein the scanned reference pulses (6) and measurement pulses (4) are time-correlated.

11. A measurement method according to claim 7, wherein the measurement pulses (4) or reference pulses (6) are repeatedly scanned and averaged in the transit time determining step (19) in a plurality of successive scanning steps (20).

12. A measurement method according to claim 7, wherein the time differences ($\tau$) from a plurality of transit time determining steps (19) at different pulse repetition frequencies (f) are used in the calculation step (18) to calculate the distance (D).

13. A hand-held laser distance measuring device with pulse reflection mixing, comprising a control device (2) for calculating a distance (D) to a measurement object (3) over at least one determinable time difference ($\tau$) between a measurement pulse (4) reflected at the measurement object (3) and a reference pulse (6) of an optically emitted transmitting pulse (7) traveling over a reference distance (5) within the device, the time difference ($\tau$) being periodic with a pulse repetition frequency (f); a local oscillator (8) for generating the transmitting pulse (7) at the pulse repetition frequency (f); at least one delay circuit (9a, 9b) which can be controlled by the control device (2), is arranged between the local oscillator (8) and at least one of a light detector (10) and a light transmitter (12), and generates a delay between scanning pulses (11) and the transmitting pulses (7) in order to scan the measurement pulse (4) and the reference pulse (6); and comprising a phase detector (14) connected to the control device (2), with the transmitting pulses (7) and scanning pulses (11) being applied to two inputs of the phase detector (14).

* * * * *